Patented Aug. 30, 1927.

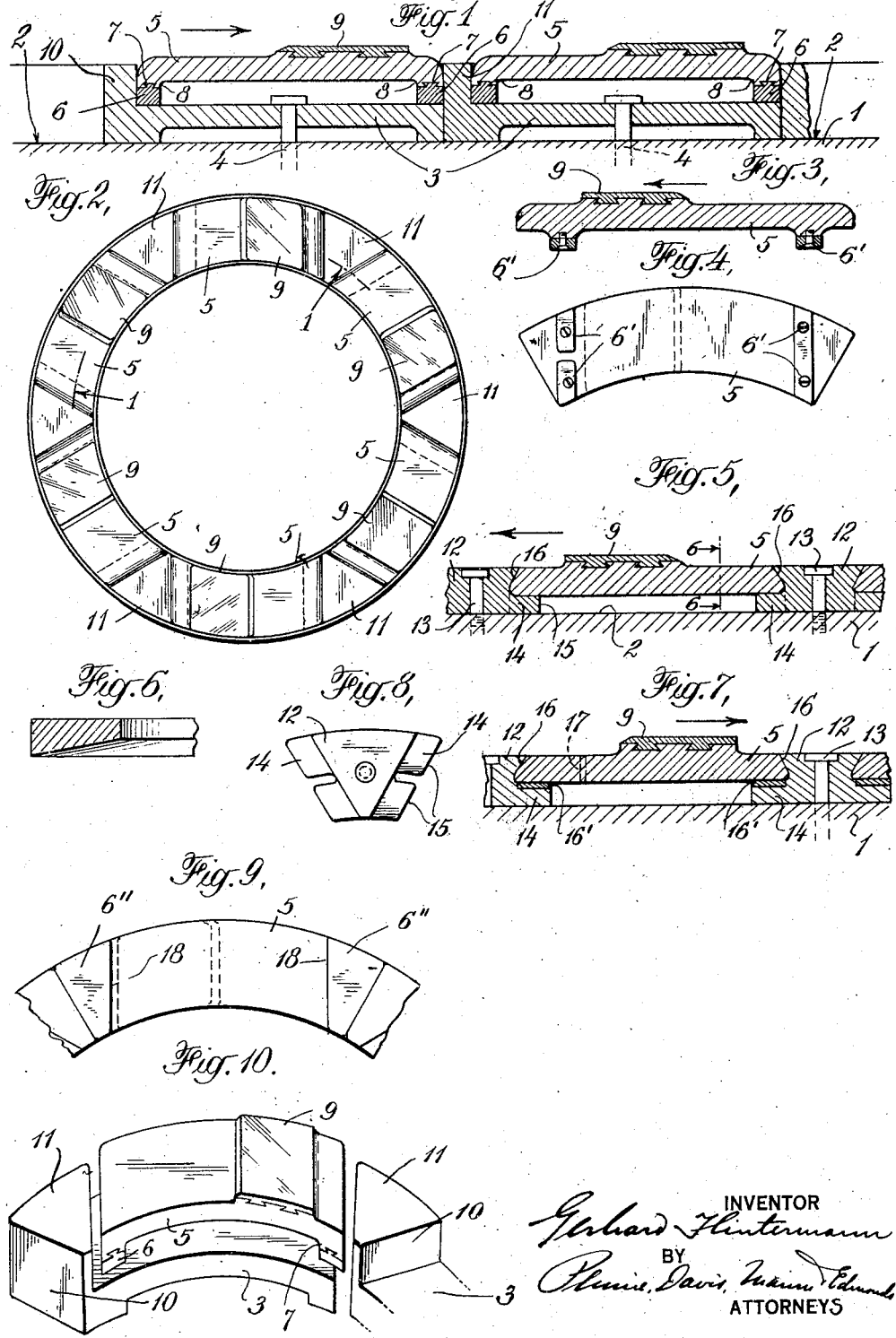
Aug. 30, 1927.                                            1,640,352
G. FLINTERMANN
BEARING
Filed July 14, 1926

1,640,352

UNITED STATES PATENT OFFICE.

GERHARD FLINTERMANN, OF WEST ORANGE, NEW JERSEY.

BEARING.

Application filed July 14, 1926. Serial No. 122,288.

This invention relates to bearings such as thrust bearings, journal bearings, slide bearings, vehicle bearings and crank pin and crank shaft bearings. More particularly the invention relates to bearings of that type in which the movement of the moving member tends to produce and maintain a wedged shaped body of oil between each bearing surface and the surface of the moving member.

Some of the bearings heretofore proposed by me comprise a plurality of separate yielding plates each of which is supported at its ends and each of which is provided with a bearing projection located between the points of support. The above mentioned wedge shaped body of oil is produced and maintained between the surface of such bearing projection and the abutting surface of the moving member. In my Patent No. 1,586,443, and in various copending applications I have disclosed various means for obtaining an efficient deflection or yielding of the plates in order to obtain an efficient wedge shaped lubricant pocked between the surface of each of the bearing projections and the surface of the abutting rotary member. It is of utmost importance that the plates deflect in an efficient manner and anything which contributes toward this end greatly increases the efficiency of the bearing. The principal object of this application is to provide certain additional improvements which operate to attain the above named result, namely a proper deflection of the plates. Other objects will appear from the following description.

The invention is illustrated in the accompanying drawings, in which:

Fig. 1 is a partial circumferential section of a thrust bearing constructed in accordance with the invention, the section being taken on the line 1—1 of Fig. 2;

Fig. 2 is a top plan view showing the arrangement of the bearing elements of the thrust bearing.

Fig. 3 is a longitudinal section of a modified form of bearing element;

Fig. 4 is a bottom plan view of the element shown in Fig. 3;

Fig. 5 is a partial circumferential section of a modified form of thrust bearing constructed in accordance with the invention;

Fig. 6 is a transverse section of one of the bearing elements taken on the line 6—6 of Fig. 5;

Fig. 7 is a partial circumferential section of a further modified form of thrust bearing constructed in accordance with the invention;

Fig. 8 is a detailed view of one of the plate supports adapted for use in the type of bearing shown in Figs. 5 and 7;

Fig. 9 is a bottom plan view of a portion of a thrust bearing illustrating another form of bearing element; and Fig. 10 is a partial perspective view showing the manner in which the plates of Fig. 1 are associated with their supports, the parts being slightly separated to show how they are assembled.

Referring first to Figs. 1 and 2 the bearing comprises a stationary member 1 having a circular groove or recess 2. A plurality of metal supports 3 are secured in the bottom of the recess 2 by means of any suitable fastening devices such as shown at 4. There is one of the supports 3 for each of the bearing elements. Each bearing element comprises a yielding plate 5 of steel or the like, and is supported at each end on a transverse strip 6 which is preferably made of brass. The strips 6 may be attached to the plates 5 by means of dove-tail connections 7. In order that the provision of the dove-tail slot in the end of each plate may not materially weaken the plate, each end of each plate is preferably made slightly thicker where the brass strip is attached the effect of which is to produce a short depending leg 8 at each end of each plate. While this feature of thickening the ends of the plates may be desirable yet if desired the brass strips may be placed directly under the ends of the plates without thickening them. The strips 6 are spacers in that they space the intervening portion of the plate away from the corresponding support 3 and they also act as cushions for the plates in the manner hereinafter explained. Each plate 5 has a bearing projection 9 which may be a body of Babbitt metal or the like secured to the upper face of the plate. If desired, the thickness of the plate may be increased at the place where the pad 9 is attached in order that the attaching means, such as the dove-tail slots and projections shown in the drawing, will not materially weaken the plate at this place. Any desired number of plates 5 may be used to make up a circular series. In the particular bearing shown in the drawing there are six plates as shown in Fig. 2.

The rotary member is not shown in the drawings, but it will be understood that it is journaled in the stationary part 1 and may be in the form of a shaft or the like having a flange which bears on the surfaces of the bearing projections 9 in the well-known manner. The direction of rotation of the moving member is indicated in the drawings by the arrows. The thrust against the bearing projections 9 tends to deflect the plates 5. In the operation of the bearing lubricant is forced between the surface of each bearing projection 9 and the abutting surface of the rotary member and tends to produce a wedge shaped oil filled pocket between these surfaces. I prefer to locate each bearing projection 9 nearer to that end of its plate which is farthest along in the direction of rotation of the rotary member. This causes those points on the surface of the bearing projection 9 which are first reached by any point on the rotary member to move farther away from the surface of the rotary member than those points which are farther along on the surface of the bearing projection. This facilitates the formation and maintenance of the wedge shaped pocket of lubricant and also causes the wedge shaped pockets to be pre-formed merely by the pressure of the rotary member against the bearing projections before the rotary member is set in motion. No doubt during the operation of the bearing this wedge shaped space is enlarged by the forcing of the lubricant into it.

The spacers 6 act as cushions because brass is softer than steel and it is sufficiently elastic within the range of pressures for which the bearing is designed. There are several advantages of cushioning the ends of the plates. One of the advantages can best be explained by first considering the action that would take place if the plates were supported at their ends on more rigid supports such for instance as steel of the same character as that of which the bodies of the plates are made. A thrust load acting on the flat surfaces of the bearing projections tends to deflect the plates in a certain way to form the above mentioned wedge shaped pocket between the surface of each bearing projection and the surface of the rotary member. If the plate is allowed to deflect in its natural way, or in other words in a way which will offer the least opposition to the formation of said wedge shaped pocket then the most desirable conditions exist. However, if the ends of each plate are supported on rigid supports the plate is not free to deflect in its most efficient manner due, among other things, to the fact that in thrust bearings of the type shown in Figs. 1 and 2 the plates are arcuate in shape and therefore the plate tends to deflect unevenly. If the ends of the plates are supported on rigid supports this tendency of the plates to deflect unevenly would set up undesirable stresses in the plate which tend to oppose the most desirable character of deformation that would produce the most efficient oil wedge. The cushions allow the ends of the plates to move downwardly in any way that is necessary in order to permit the plate to deflect in that particular way which will produce the most efficient oil wedge. In other words, the undesirable stresses mentioned above are prevented or absorbed because the cushions do not materially oppose the bending action of the plates in deforming the way they want to when pressure is applied to the surfaces of the bearing projections.

Obviously the spacers 6 can be attached to the supports 3 instead of to the plates 5 or one of the spacers of each plate can be attached to the plate and the other spacer can be attached to the support. However, I prefer to attach both spacers of each plate to the plate itself as this arrangement has manufacturing advantages and it is believed that the plates deflect more efficiently and more readily when the spacers are attached to the plates than when they are attached to the supports.

Another advantage of the cushion spacers resides in the fact that they allow the plates to more readily accommodate themselves to conditions of misalignment. Moreover, they also function during periods of overload to permit the plates to move bodily downward a microscopic distance without destroying the oil wedges. Furthermore, they assist in conducting away the heat from the plates as the heat conductivity of brass and most other metals which would likely be used as a substitute for brass is higher than steel. It has been stated that the cushion spacers are preferably made of brass. However, any other metal may be used that has the necessary properties. Likewise the plates 5 may be made of other metals than steel. The important thing is that the relation between the metal of the cushion spacers and the metal of the plates be such that the cushioning action described above is obtained. In fact resilient cushion devices of a very different type such, for instance, as springs, might be substituted for the brass strips 6 if they are so designed as to allow the plates to deflect in the most efficient manner when the wedge shaped pockets are formed between the surfaces of the bearing projections and the surface of the rotary member.

Another feature illustrated in Figs. 1 and 2 which helps to bring about an efficient deflection of the plates is that the spacers 6 on each plate are disposed parallel with each other as shown in Fig. 2. Inasmuch as the plates are arranged in a circle the most obvious way to shape the plates would be to make them with converging ends or in other words shaped like a sector with the meeting edges of two plates coinciding with a radius of the circle. However, a better deflection of the plates is obtained and the construction is greatly simplified by making the ends of the plates parallel as shown in Fig. 2, and by making each spacer 6 of uniform width throughout and parallel in its entirety to the spacer at the other end of the plate. This arrangement would leave a triangular shaped gap between the ends of the plates, but each support 3 (in the form illustrated in Figs. 1 and 2 is provided near one end with an upstanding projection 10 which in plan view is triangular shaped as shown at 11 in Fig. 2 to fill the gap that would otherwise exist between the adjoining ends of the plates. This is more clearly shown in Fig. 10 which shows a plate slightly separated from its support. Obviously the plates 5 may, if desired, be positioned directly in the bottom of the recess 2 and the triangular gaps between the ends of the plates could be filled by separate filler blocks which would be similar to the end portions 10 of the supports without the remainder of the support.

Figs. 3 and 4 illustrate a plate which is well adapted to be positioned directly in the groove 2 without the use of the supports 3 of Fig. 1. The ends of the plate shown in Fig. 3 converge so that it is not necessary to use a filler block of any kind between the ends of adjacent plates. The spacing strips 6', however, are parallel to each other as shown in Fig. 4. If desired, one or both of the spacing members 6' may be divided into two or more parts to facilitate slight transverse tilting of the plates in order to allow them to more readily accommodate themselves to inaccuracies of alignment. In Fig. 4 one of the spacing members 6' is shown divided into two parts and when only one of them is so divided it is preferably that one which is nearer to the bearing projection 9. This feature of dividing the spacing members may also be applied to the construction shown in Figs. 1 and 2. In Figs. 3 and 4 the spacing members are held in place by means of screws and this system of fastening may, if desired, be utilized in any of the other forms of the invention. Of course the dove-tail connection of Figs. 1 and 2 could be utilized also in Figs. 3 and 4, but the screws are shown as an alternative type of fastening means.

In the modification of Fig. 5 the adjacent ends of each pair of plates are supported on a common member 12 secured to the bottom of the groove 2 by a suitable fastening device such as shown at 13. The two ends of each plate are parallel as in Fig. 1. Each supporting member 12 has a pair of step like ledges or projections 14 for supporting the adjacent ends of a pair of plates. The outer edge 15 of the ledge 14 is preferably parallel with the end of the plate. This will cause the edge 15 of one of the ledges 14 to be parallel with the corresponding edge of the ledge at the other end of the same plate. The ends of the plates may be slightly beveled as shown at 16 and the vertical wall of the supporting member 12 above the ledge 14 may be similarly inclined so as to facilitate holding the plates in place. The supporting members 12 are made of brass or some metal having similar properties and therefore the ledges 14 perform the same function as the brass spacers 6 and 6' in Figs. 1 to 4 inclusive. In order to allow a slight transverse tilting of the plates in the manner described in connection with Figs. 3 and 4 the ledge 14 may be divided into two or more parts as shown in Fig. 8.

In Fig. 5 the plates are preferably tapered in a transverse direction as shown in Fig. 6, the outer portion of the plate being thicker than the inner portion. The surfaces of the ledges 14 should be correspondingly inclined so that the upper surface of the plates will be level. The tapering of the plates in this manner may serve to remove some or all of the opposition to an efficient bending of the plates that may be due to their arcuate shape. This feature of tapering the plates transversely may, if desired, be utilized in any of the other forms of the invention.

In Fig. 7 the arrangement is quite similar to that shown in Fig. 5, but according to this figure the entire support 12 need not be made of brass or metal having similar properties but may be made of any metal in view of the fact that a cushion of brass or the like 16' is interposed between each ledge 14 and the corresponding end of the plate 5. The cushions 16' act in the same manner as the cushions 6 and 6' and the ledges 14 of Figs. 1 to 6 inclusive. The plates in any of the figures may, if desired, be provided with oil ducts 17 to permit oil to pass from the space below the plates to the space above them.

Fig. 9 shows the under side of a plate having converging ends as in Figs. 3 and 4, but the supporting cushions 6" corresponding to those shown at 6' in Figs. 3 and 4, instead of being in the nature of a strip having parallel edges is in the nature of a triangular body which extends out to the extreme end of the plate. However, the inner edge 18 of one of the cushions is parallel with the corresponding inner edge of the cushion at the other end of the plate. The cushion spacers 6" may be of brass or some metal having similar properties as in the other figures. The arrangement shown in the other figures where the spacing cushion has two parallel edges is preferred as it makes it possible to eliminate the excess metal which must be employed when it has the shape shown in Fig. 9 and it is advisable to have no excess metal in any portion of the plate otherwise the stresses in such excess metal may not be properly relieved.

It will now be seen that in all forms of the invention the ends of each plate are supported on relatively soft and elastic metal cushions which allow the plates to deflect in the most efficient manner. The cushions also permit the plates to adapt themselves to conditions of misalignment and they also permit of a microscopic bodily downward movement of the plates in case of overload. This bodily downward movement of the plates takes place during periods of overload without destroying the wedge shaped bodies of lubricant between the bearing projections and the surface of the rotary member. The efficient deflection of the plates brought about by the provision of the cushions results in an even inclination of the surface of the bearing projection with respect to the surface of the rotary member and results in an oil pocket of the most advantageous shape. The cushions also reduce the friction between those parts of the plates and those parts of the support which move relative to each other. The cushioning effect obtained by the used of the spacers of brass or the like also prevents to a certain degree an undesirable enlarging of the oil wedge and in this manner keeps down the pressures set up between the surfaces of the bearing projections and the surface of the moving member.

The bearing projections 9 although shown and described as a separate pad of Babbitt metal or the like may, if desired, be an integral part of the plate.

All of the features herein disclosed, except those which are peculiar to thrust bearings, are applicable to bearings of other types such as journal bearings, slide bearings and the like.

I claim:

1. A bearing for moving members comprising a bearing element, a support therefor, spacing members to space an intervening portion of the bearing element away from the support, and a bearing projection on said bearing element located between the spacing members, the surface of said bearing projection being adapted to make sliding contact with the surface of the moving member, said intervening portion of the bearing element being adapted to bend or deflect and said spacing members being sufficiently rigid to cause bending or deflection of said intervening portion of the bearing element but serving to cushion the ends of the bearing element for the purpose described.

2. A bearing in accordance with claim 1 in which at least a portion of the spacing members is elastic and softer than the material of the bearing element.

3. A bearing in accordance with claim 1 in which the spacing members are elastic and softer than the material of the bearing element.

4. A bearing in accordance with claim 1 in which the spacing members are made of brass.

5. A bearing in accordance with claim 1 in which the bearing elements are made of steel and the spacing members are made of brass.

6. A bearing in accordance with claim 1 in which the bearing element and spacing members are made of dissimilar metals, the metal of the spacing members being elastic and softer than the metal of the bearing element.

7. A bearing in accordance with claim 1 in which the inner edges of the spacing members are parallel to each other.

8. A bearing in accordance with claim 1 in which the spacing members are in the form of parallel strips each of which has parallel edges.

9. A bearing in accordance with claim 1 in which at least one of the spacing members is divided into at least two parts.

10. A bearing comprising a circular series of separate yielding plates each of said plates being supported at its ends to provide an intervening yielding portion and a bearing projection on such intervening portion, the two ends of each plate being parallel to each other.

11. A bearing in accordance with claim 10 in which filler blocks are interposed between the ends of each pair of plates.

12. A bearing comprising a support, an arcuate plate, spacing strips for spacing an intervening portion of the plate from the support, a bearing projection on the plate located between the spacing strips, the inner edge of one spacing strip being parallel to the inner edge of the other spacing strip and the two edges of each spacing strip being parallel to each other.

13. A bearing in accordance with claim 12 in which at least one of the spacing strips is divided into at least two parts.

In testimony whereof I affix my signature.

GERHARD FLINTERMANN.